United States Patent [19]

Nivet

[11] 3,954,238
[45] May 4, 1976

[54] SAFETY CLAMP

[75] Inventor: André Nivet, Beauchamp, France

[73] Assignee: ITW de France, Beauchamp, France

[22] Filed: Sept. 19, 1974

[21] Appl. No.: 507,309

[30] Foreign Application Priority Data

Oct. 10, 1973   France .............. 73.36176

[52] U.S. Cl. .................. 248/68 CB; 248/74 PB
[51] Int. Cl.² .................. F16L 3/22; F16L 3/08
[58] Field of Search .................. 16/150, DIG. 13; 24/16 PB, 30.5 P, 73 AP, 255 SL, 257 R, 73 CC, 73 SA, 81 CC, 81 TH, 255 C; 220/339; 248/68, 71, 73, 74

[56] References Cited

UNITED STATES PATENTS

| 1,160,047 | 11/1915 | Conner .......................... 248/71 |
| 3,126,184 | 3/1964 | Kropp ........................... 248/73 |
| 3,126,185 | 3/1964 | Christman ...................... 248/74 PB |
| 3,186,540 | 6/1965 | Breger ............................ 220/339 X |
| 3,186,574 | 6/1965 | Davidson ........................ 16/150 X |
| 3,421,187 | 1/1969 | Ryder ............................ 248/74 PB X |
| 3,462,804 | 8/1969 | Renaudin ....................... 248/74 R X |

FOREIGN PATENTS OR APPLICATIONS

| 306,165 | 6/1955 | Switzerland .................... 248/74 R |
| 1,147,914 | 12/1967 | United Kingdom ............ 24/73 AP |
| 283,140 | 4/1965 | Australia ......................... 24/73 AP |

OTHER PUBLICATIONS

Garner, Def. Pub. Search Copy of Serial No. 6,804, filed 1-29-70, No. T884,011.

*Primary Examiner*—Roy D. Frazier
*Assistant Examiner*—Lawrence J. Staab
*Attorney, Agent, or Firm*—Jack R. Halvorsen; Robert W. Beart

[57] ABSTRACT

A clamp for fixing tubular elements, constituted by a one piece moulded member comprising, mounted on a base for attachment to a wall: a collar with two arms for receiving the tubular element to be attached provided with one orifice for introducing said element inside the collar, said orifice being formed by the space between the free extremities of said arms, the inner face of said collar having the shape of a portion of the outer face of the element; a security cam formed by a member the general shape of which is cylindrical, articulated by one of its extremities onto one of the arms of the collar, having at the other extremity a shoulder cooperating with one shoulder formed on the other arm of the collar in order to lock the cam onto the collar.

2 Claims, 7 Drawing Figures

SAFETY CLAMP

The present invention relates to safety clamps, more particularly for securing conduits such as piping, sheaths and cables of various kinds to fixed members such as partitions or walls provided with safety means to prevent such conduits from being ripped off, and most notably applicable for safely securing sheaths, cables or piping of various kinds on motor vehicles.

As is well-known, motor vehicles have numerous conduits of all kinds whose function is to supply various parts of the vehicle from an energy source in order to permit operation by means of pressurized fluids or electrical energy, the transfer of energy from the source to the unit utilizing these various powering agents being effected through piping or electrical cables or through mechanical Bowden cables. For obvious safety reasons, it is necessary for such piping or cables to be fixed to the vehicle walls by means of a support and for them to be secured to such support strongly enough to prevent them from being accidentally ripped off as the result of a force inadvertently exerted on a part of the vehicle. Prior art supports in the form of securing collars for receiving such tubing, sheaths or cables by mere clipping thereon do not meet this last requirement, and therefore such tubing, sheaths or cables can be accidentally ripped out of their securing collars and, in some cases, jeopardize the reliability of the vehicle to which they are associated and hence the safety of its passengers.

The present invention overcomes this drawback by providing a clamp for securing generally tubular shaped members, said clamp incorporating a safety locking device for preventing said members from being pulled away from their securing collars.

The subject clamp of this invention for securing generally tubular or regular prism-shaped elements is formed by a one-piece moulded member comprising, mounted on a base for attachment to a wall: a collar with two arms for receiving and securing without play the tubular element to be attached, provided with an orifice for insertion of said element into the collar, formed by the gap existing between the free ends of said arms, the inner face of said collar matching the shape of a portion of the outer face of said element; a safety cam consisting of a generally semi-cylindrically shaped member having its longitudinal axis parallel to that of the collar one end of which is hingedly connected to one of the arms of the collar through the agency of a thin strip moulded to the collar and the cam, about which hinge-strip said collar is rotatable, and parallel to the longitudinal axis of the collar, said cam comprising at least one shoulder turned towards the concavity of its inner face and disposed on its other end, said shoulder cooperating with a further shoulder of matching shape disposed externally on the other arm of the collar at a point such that, when the cam is closed down over the orifice for insertion of the tubular element into the collar, the cam shoulder snaps into the shoulder formed on said collar whereby to lock the cam onto the collar.

Preferably, the inner face of the safety cam comprises a projecting cusp the shape and size of which are such that when the cam is in the locking position the end face of the cusp matches the shape of at least that part of the outer face of the tubular element which is located within the insertion orifice of the collar and is in contact without play therewith.

Preferably also, the attachement collar is provided with two locking devices, the hinge-bearing arm thereof being accordingly formed with a shoulder on its outer face and the cam being formed on its inner face proximate the hinge-strip with a shoulder shape matching the aforementioned shoulder, said two shoulders being respectively so positioned on the collar and the cam that when the cam is moved down into the locking position they snap together to form a second locking means.

In one form of embodiment applicable for securing regular prism-shaped elements, the collar has an inner surface to match that of a first half of the prism shape of the element to be secured, while the cam has an inner surface shaped to match that of the second half of the prism shape of said element, the shapes of the inner faces of the collar and the cam being mutually complementary whereby to form a hollow prismatic surface matching the outer prismatic surface of the element when the cam is placed in the locking position.

Preferably, the cam of the attachment collar is provided on its hinge-proximate end, with a curved catch the concave part of which is directed towards said hinge, the collar arm bearing said hinge being formed opposite said catch with a recess for receiving the same when the cam is moved down into the locking position, the shapes and dimensions of said catch and said recess being such that, in the locking position, the concave face of said catch faces the corresponding part of the hinge and is in contact therewith whereby to form further means for locking the cam onto the collar. Conversely, the catch may be provided on the collar and the receiving recess on the cam.

Lastly, lateral play of the cam on the collar must be avoided as much as possible. If the cam is as wide as the collar, lateral play can be limited by causing the two snap-fastening shoulders to be flanked. If the cam is narrower than the collar it can be flanked by projecting portions formed on said collar. Either method can be used when the cam is narrower than the collar.

Further particularities and advantages of the present invention will emerge clearly from the description which follows of different possible forms of embodiment given with reference to the accompanying non-limitative exemplary drawings, in which.

In all the figures in the drawings, like parts are designated by like reference numerals.

Figure 1:
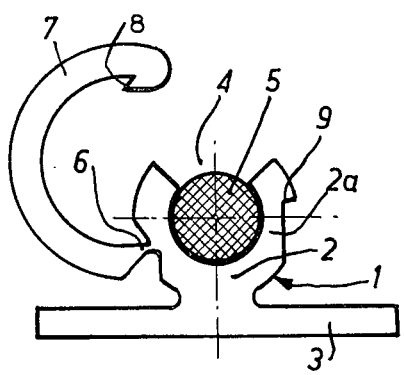
FIG. 1 is a cross-sectional illustration of a securing clamp according to the invention having a single safety cam.
Figure 5:
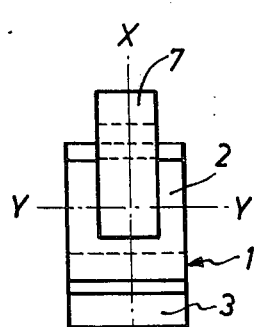
FIG. 5 is a longitudinal sectional illustration of a securing clamp according to the invention having a safety cam of smaller width than the collar.
Figure 6:
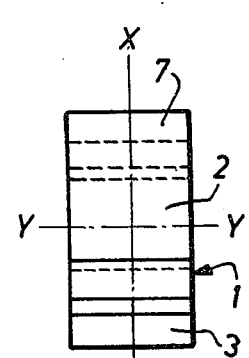
FIG. 6 is a longitudinal sectional illustration of a securing clamp according to the invention.

Referring first to FIG. 1, the subject one-piece securing clamp of the invention shown thereon consists in its simplest form of a moulded member 1 made of any convenient synthetic material and possessing a degree of elasticity. The one-piece member 1 comprises the clamping collar 2 proper mounted on a base 3 enabling member 1 to be fixed in any manner well-known per se to any convenient support. The non-fully closed collar 2 is formed with two arms between the free ends of which exists a gap 4 of width smaller than the diameter of the tubing, sheath or cable element 5 which it designed to support, said element 5 being forcibly inserted through gap 4 and in the process causing an elastic spreading apart of the two lateral arms of the collar and, after passing thereinto, a closing-up of said two arms once more, whereby the element is imprisoned without play in the collar and the inner face of the latter is thus in contact with a large portion of the outer face of shape matching said element. On one side of the collar 2, substantially midway between orifice 4 and base 3, is hingedly connected, by means of a hinge parallel to its longitudinal axis 6, a safety cam 7 formed by a substantially semi-annular member rotatable about said hinge in parallelism with the median transverse plane X—X of the securing collar (see FIGS. 5 and 6). The hinge-remote end of cam 7 is formed with a shoulder 8 facing the concave part of said cam. Similarly, the free terminal portion of the collar arm 2a opposite the collar arm hingedly supporting semi-annular cam 7 is formed with an external shoulder 9 matching the shape of the terminal shoulder 8 on cam 7. The length of cam 7 is such that, when it is rotated about hinge 6, its free end is fetched opposite the free end of collar arm 2a and shoulder 8 snaps over shoulder 9, thereby dependably locking the cam over collar arm 2a.

The component parts of the securing clamp hereinbefore described may be variously devised, and a number of such non-limitative exemplary embodiments will be described hereinbelow.

Figure 2:
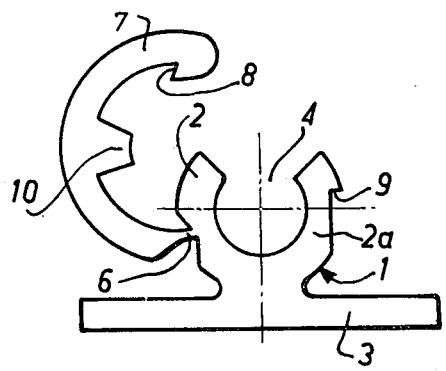
FIG. 2 is a cross-sectional illustration of a securing clamp according to the invention having a safety cam adapted to the opening in a snap-fastenable collar.
Figure 3:
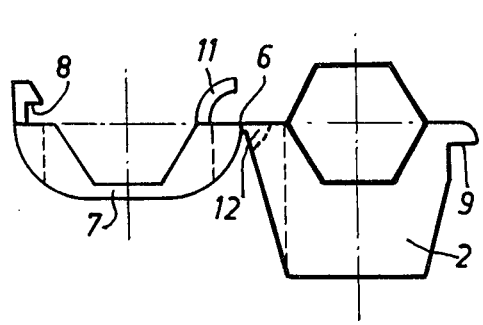
FIG. 3 is a cross-sectional illustration of a securing clamp according to the invention having a safety cam provided with a catch adapted to the opening in a snap-fastenable collar.

Thus the safety cam may assume any convenient shape. It may be configured as shown in FIG. 1 so as to merely engage over the element 5 to be secured without making contact therewith. As shown in FIG. 2, the inner wall of the cam may be formed with a projecting cusp 10 the shape of which enables it in the locking position to match in part or in full the orifice 4 for insertion of element 5 into the collar whereby to fully or partly fill said orifice and bear against the secured element 5, a portion of the shape of whose outer lateral surface it matches with its end face. As shown in FIG. 3, the shape of collar 2 may be matched to the regular prism shape of the element to be secured when the same is so shaped, its inner wall having a cross-section shaped to match one half of the cross-section of said element, in which case the inner face of the safety cam will have a cross-sectional shape matching the other half of the cross-section of said element, whereby when said cam is in its locking position said element is surrounded over its entire periphery both by the collar and the cam in contact therewith without play. FIG. 3 represents an element of regular hexagonal section to be supported and secured, in which the three consecutive lateral faces are in contact without play with the inner hexagonal face of the collar, and it will be seen that the other three faces of the element will be in contact without play with the other inner semi-hexagonal and complementary face of the collar when the cam is in the locking position. Manifestly, the respective inner faces of the collar and the safety cam can be shaped to match any regular polygonal cross-section of an element to be supported and secured provided that the same has at least one diametrical symmetry axis. Thus, because the inner faces of the collar and the cam exactly match the shape of the outer faces of the element to be supported without play, it is possible to secure in position elements the shape of whose cross-section prevents them from being restrained within the collar by a snap-fastening action as with elements of circular cross-section.

Figure 4:
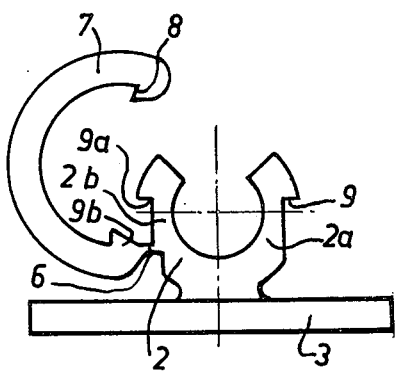
FIG. 4 is a cross-sectional illustration of a securing clamp according to the invention having a safety cam provided with dual locking means.

Further, as shown in FIG. 4, the securing clamp of this invention can be provided with two locking means instead of one. Accordingly, collar 2 is provided with a second shoulder 9a disposed on the collar arm 2b facing the arm 2a bearing the hinge 6 and on its end the first shoulder 9, while cam 7 is itself provided with a shoulder 9b of shape matching that of shoulder 9a, the said two shoulders 9a and 9b being so shaped and located that, when the safety cam is in its locking position, they face each other in mutual contact ready to mutually engage and form a second collar locking means. Thus accidental fracturing of the hinge 6 will not cause the cam and collar to separate, which, despite the latching, could happen if the latching were ensured solely through the mutual engagement of cusps 8 and 9.

As stated precedingly, the safety cam is attached to the collar through a hinge 6. The latter may be formed by a very thin portion moulded in one piece with the clamp and consequently made of the same synthetic material as the clamp and either extending over its entire length or attached thereto at a few points only.

In the alternative embodiment hereinbefore described with reference to FIG. 3, safety cam 7 preferably comprises, on its diametrical terminal end face remote from and coplanar with its end face bearing said shoulder 8, that is to say on its side proximate the hinge 6, a catch 11 curving away from said cam on the hinge side thereof, the body portion of the collar having a recess 12 therein formed over a length equal to and facing the catch 11 but not encroaching upon the hinge 6, the shape of said recess, its position and the position of the hinge being such that when the cam is swung over to be locked in position by means of cusps 8 and 9, the catch 11 engages into said recess and has its concave face bear against the hinge portion corresponding to said recess. Thus when the cam engages over the element to be secured, it is locked securely in position both by the snap-fastening action of cusps 8 and 9 on one side, and through the catch 11 bearing against the hinge 6 on the other side.

Figure 7:
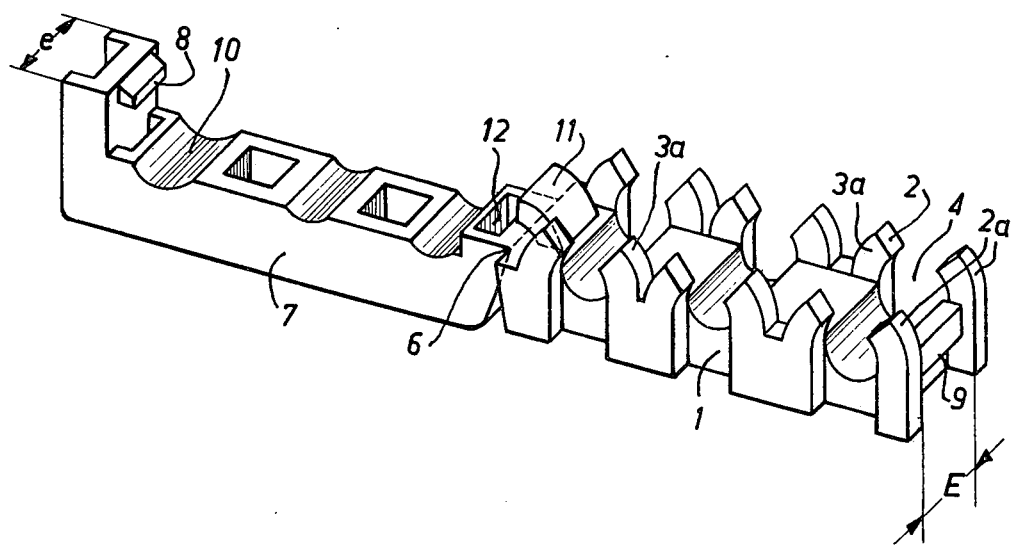
FIG. 7 illustrates in perspective a securing clamp for a plurality of conduits, having a safety cam matching the shapes thereof the safety catch of which is supported on the body of the collar with elimination of lateral cam play.

Obviously, a plurality of tube, sheath or cable elements may be secured with a safety cam configured to match the different shapes to be secured, as shown in FIG. 7 in which the safety catch 11 described with reference to FIG. 3 is represented on the body portion of collar 2 and the recess 12 on the safety cam 7. The safety cam is shown as having a width e less than the width E of the collar, and the snap-fastening of the portions 8 and 9 is flanked by the collar portions 2a, thereby restricting lateral play in the cam. Such play can likewise be limited by the collar portions 3a flanking the cam, the latter being narrower than the collar.

In the various forms of embodiment of the subject clamp of this invention described hereinbefore, the safety cam may either have the same width as the body of collar 2 (FIG. 6) or occupy only a portion of the width thereof (FIGS. 5 and 7), in which latter case the collar and the cam will have the symmetry plane X—X of the collar as their common symmetry plane.

It goes without saying that changes and substitutions of parts may be made in the preferred exemplary embodiments described hereinabove with reference to the accompanying drawings, without departing from the scope of the invention as set forth in the appended claims.

I claim:

1. Safety clamp for securing at least one element of a general tubular or regular prism shape constituted by a one-piece moulded member mounted on a base for attachment to a wall, comprising: a collar with at least two arms for receiving and maintaining without play at least one tubular element to be attached, said collar provided with at least one orifice for introducing said at least one element inside the collar, said orifice formed by the space between the free extremities of adjacent arms, the inner face of said collar substantially matching the shape of at least 50% of the outer face of said at least one element; a security cam constituted by a member generally annular in configuration and having its inner face matching the balance of the shape of the outer face of said element and having its longitudinal axis parallel to that of the collar, one extremity of said cam is connected to one of the arms of the collar by means of a hinge formed by a thin strip integrally moulded to the collar and the cam about which hinge it is movable in rotation parallel to the longitudinal axis of the collar, said cam including two shoulders turned towards the concavity of its inner face and disposed adjacent each extremity, said shoulders each cooperating with a shoulder the shape of which matches it, externally disposed on the adjacent arm of the collar at a point such that, when the cam is closed down over the orifice for retaining the tubular element in the collar, the shoulders of the cam snaps onto the shoulders of said collar to form a means locking the cam onto the collar independent of said hinge means, said inner face of the security cam includes at least one projecting cusp the shape and dimensions of which are such that, when the cam is in locking position, the end face of the cusp matches a substantial portion of the shape of at least one part of the outer face of the tubular elements located in the introduction orifice of the collar and substantially closes said orifice and is in contact with said outer face of said element to secure said element without play within said collar.

2. Safety clamp according to claim 1, in which the possible lateral play of the cam is eliminated by capturing the cam in out-flanking parts of the collar.

* * * * *